US007793501B2

(12) United States Patent
Narayanaswamy et al.

(10) Patent No.: US 7,793,501 B2
(45) Date of Patent: Sep. 14, 2010

(54) APPARATUS FOR STEAM ATTEMPERATION USING FUEL GAS HEATER WATER DISCHARGE TO REDUCE FEEDWATER PUMP SIZE

(75) Inventors: Kowshik Narayanaswamy, Karnataka (IN); Prakash Narayan, Tamil Nadu (IN)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 12/245,267

(22) Filed: Oct. 3, 2008

(65) Prior Publication Data

US 2010/0083661 A1 Apr. 8, 2010

(51) Int. Cl.
*F01K 7/34* (2006.01)

(52) U.S. Cl. ............................ 60/653; 60/646; 60/657; 60/679

(58) Field of Classification Search .................. 60/653, 60/646, 657, 670, 679
See application file for complete search history.

(56) References Cited

U.S. PATENT DOCUMENTS 2,984,984 A * 5/1961 Dickey ........................ 60/647
7,028,480 B2 * 4/2006 Sekiai et al. .................. 60/646
2007/0113562 A1 * 5/2007 Tomlinson et al. ............ 60/778

FOREIGN PATENT DOCUMENTS

JP 2006-071166 A 3/2006

* cited by examiner

*Primary Examiner*—Hoang M Nguyen
(74) *Attorney, Agent, or Firm*—Fletcher Yoder

(57) ABSTRACT

Attemperation systems and methods for cooling steam bypassed from a steam turbine during tripping of the steam turbine are provided in the disclosed embodiments. The systems may be configured to deliver water discharged from a fuel gas heater to a bypass attemperator, where the water discharged from the fuel gas heater may be used to cool the bypass steam. Before being used by the fuel gas heater, the water used to heat the fuel gas may be heated by an economizer. The water may be delivered to the economizer by an intermediate pressure stage of a boiler feedwater pump. In the disclosed embodiments, the intermediate pressure stage of the boiler feedwater pump may also be used to supply water to a re-heater attemperator, which may be used to further cool the steam after it has been delivered from the bypass attemperator to a re-heater. In addition, the intermediate pressure stage of the boiler feedwater pump may deliver water directly to the bypass attemperator as a supplemental water source.

20 Claims, 4 Drawing Sheets

APPARATUS FOR STEAM ATTEMPERATION USING FUEL GAS HEATER WATER DISCHARGE TO REDUCE FEEDWATER PUMP SIZE

BACKGROUND OF THE INVENTION

The present invention relates generally to steam attemperation. More specifically, the invention relates to attemperation of steam bypassed from a steam turbine during tripping of the steam turbine.

In combined cycle power plants, heated exhaust from a gas turbine may be sent to a heat recovery steam generation (HRSG) system for producing steam, which may be used in steam turbines. HRSG systems may produce steam at very high temperatures. In particular, HRSG systems may include superheaters and re-heaters, which superheat steam used by the steam turbines. During tripping of the steam turbines, the steam may bypass the steam turbine. In this scenario, the steam temperatures, if uncontrolled, may become even greater in that the steam may simply loop between the superheaters and re-heaters.

If the steam from the superheaters and re-heaters reaches high enough temperatures, the steam turbine, as well as other equipment downstream of the HRSG, may be adversely affected. For instance, high cyclic thermal stress in the steam piping and steam turbine may eventually lead to shortened life cycles. Conventional control systems have been devised to help monitor and control the temperature of steam within HRSG systems. However, these conventional control systems often involve using attemperation systems, which utilize water from dedicated water sources as the cooling medium. Using dedicated water sources and piping may lead to oversizing of water tanks and water pumping equipment, thereby leading to increased footprints of the equipment and overall HRSG system.

BRIEF DESCRIPTION OF THE INVENTION

In one embodiment, a method of cooling steam bypassed from a steam turbine during tripping of the steam turbine is provided. The method includes delivering water from an intermediate pressure stage of a boiler feedwater pump to an economizer. The method also includes heating the water using the economizer. The method further includes delivering the water from the economizer to a fuel gas heater. In addition, the method includes transferring heat from the water to a fuel gas via the fuel gas heater, thereby heating the fuel gas and cooling the water. The method further includes delivering the water from the fuel gas heater to a bypass attemperator. The method also includes transferring heat from the steam bypassed from the steam turbine to the water from the fuel gas heater via the bypass attemperator, thereby cooling the steam.

In another embodiment, a method of cooling steam is provided. The method includes delivering water from a fuel gas heater to a bypass attemperator. The method also includes cooling steam using the bypass attemperator and the water from the fuel gas heater.

In yet another embodiment, a steam attemperation system is provided. The steam attemperation system includes a fuel gas heater configured to heat fuel gas using heated feedwater and to discharge the water after use in the fuel gas heating process. The steam attemperation system also includes a bypass attemperator configured to cool steam using the water discharged from the fuel gas heater, wherein the steam has been bypassed from a steam turbine during tripping of the steam turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Attemperation systems and methods for cooling steam bypassed from a steam turbine during tripping of the steam turbine are provided in the disclosed embodiments. The systems may be configured to deliver water discharged from a fuel gas heater to a bypass attemperator, where the water discharged from the fuel gas heater may be used to cool the bypass steam. Before being used by the fuel gas heater, the water used to heat the fuel gas may be heated by an economizer. The water may be delivered to the economizer by an intermediate pressure stage of a boiler feedwater pump. In the disclosed embodiments, the intermediate pressure stage of the boiler feedwater pump may also be used to supply water to a re-heater attemperator, which may be used to further cool the steam after it has been delivered from the bypass attemperator to a re-heater. In addition, the intermediate pressure stage of the boiler feedwater pump may deliver water directly to the bypass attemperator as a supplemental water source.

Figure 1:
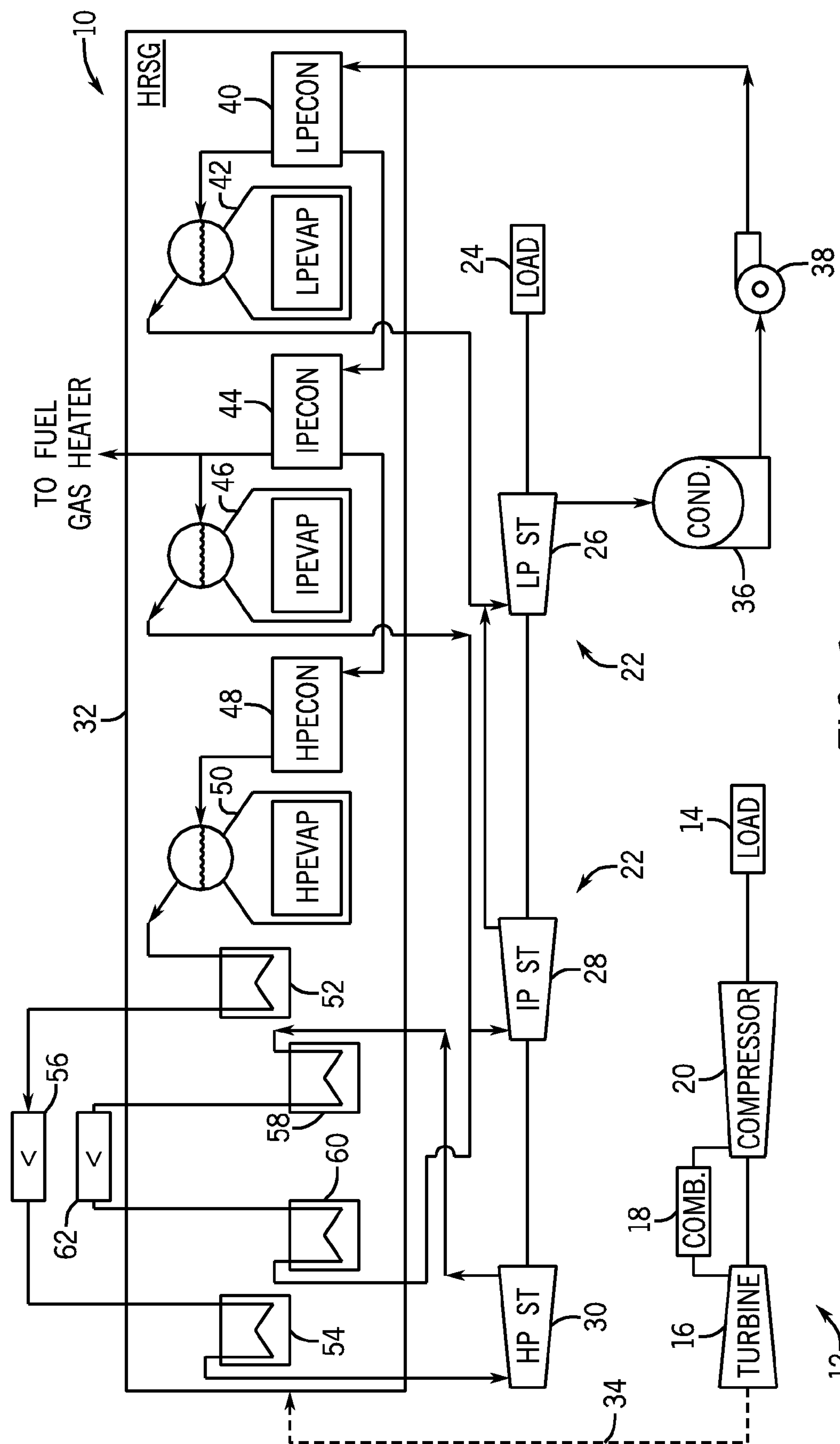
FIG. 1 is a schematic flow diagram of an exemplary combined cycle power generation system which may utilize the steam attemperation systems and methods of the disclosed embodiments.

FIG. 1 is a schematic flow diagram of an exemplary combined cycle power generation system 10 which may utilize the steam attemperation systems and methods of the disclosed embodiments. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In the illustrated embodiment, the steam turbine 22 may include one low-pressure stage 26 (LP ST), one intermediate-pressure stage 28 (IP ST), and one high-pressure stage 30 (HP ST). However, the specific configuration of the steam turbine 22, as well as the gas turbine 12, may be implementation-specific and may include any combination of stages.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure stage 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), which is a device configured to heat feedwater with gases, may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure stage 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 12. Steam from the intermediate-pressure evaporator 46 may be sent to the intermediate-pressure stage 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure stage 30 of the steam turbine 22. Exhaust from the high-pressure stage 30 of the steam turbine 22 may, in turn, be directed into the intermediate-pressure stage 28 of the steam turbine 22. Exhaust from the intermediate-pressure stage 28 of the steam turbine 22 may be directed into the low-pressure stage 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure stage 30 of the steam turbine 22 may be directed into a primary re-heater 58 and a secondary re-heater 60 where it may be re-heated before being directed into the intermediate-pressure stage 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 10, hot exhaust may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes that use superheated steam. The gas turbine 12 generation cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

Inter-stage attemperation may be used in HRSG systems in combined cycle power generation applications as illustrated in FIG. 1. The HRSG 32 generally maintains a pre-determined design steam temperature to maintain the efficiency of the processes and the life of the steam turbine 22 and associated equipment. In the event of excessive steam temperatures, beyond the control of the inter-stage attemperation system, the gas turbine 12 exhaust temperature into the HRSG 32 may be reduced to avoid high stress in the downstream steam turbine 22 and associated equipment. In some cases, the system may trip the gas turbine 12 and/or steam turbine 22 to avoid excessive temperatures. This may result in a loss of power generation which may, in turn, impair plant revenues and operability. In addition, tripping of the steam turbine 22 may create even bigger problems with respect to recycled superheated steam temperatures. Inadequately controlled steam temperatures may lead to high cyclic thermal stress in the steam piping and steam turbine 22, affecting their useful life. However, superheater and re-heater inter-stage attemperation may help achieve robust temperature control of the steam in the HRSG 32.

As discussed below, the disclosed embodiments enable efficient inter-stage attemperation of the superheaters and re-heaters of the HRSG 32 during tripping of the steam turbine 22 by supplying a bypass attemperator with feedwater from a boiler feedwater pump via a fuel gas heater. The boiler feedwater pump supplies the fuel gas heater with feedwater whenever the steam turbine 22 is not being tripped. In the disclosed embodiments, the feedwater supplied to the fuel gas heater may be forwarded to the bypass attemperator instead of being directed into a condenser. By supplying the feedwater to the bypass attemperator through existing pumps and piping, the sizing of the pumps and piping may be maintained, instead of oversizing the pumps and piping to accommodate additional flow during tripping of the steam turbine 22.

Figure 2:
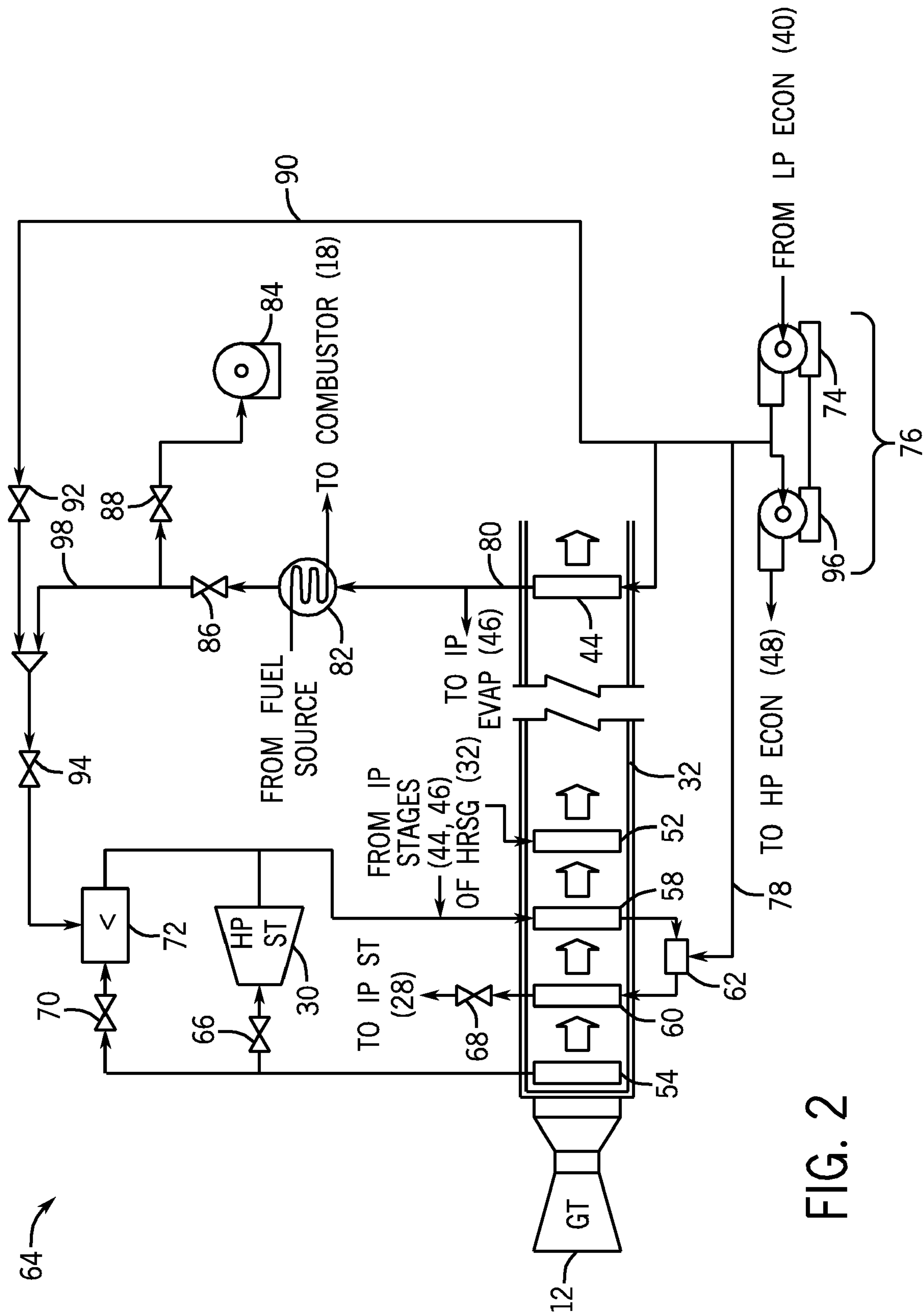
FIG. 2 is a more detailed schematic flow diagram of an exemplary combined cycle power generation system which may utilize the steam attemperation systems and methods of the disclosed embodiments.

FIG. 2 is a more detailed schematic flow diagram of an exemplary combined cycle power generation system 64 which may utilize the steam attemperation systems and methods of the disclosed embodiments. As described above, under normal operating conditions, high-temperature exhaust from the gas turbine 12 may enter the HRSG 32 where it may be used to generate superheated steam via the finishing high-pressure superheater 54, secondary re-heater 60, primary re-heater 58, and primary high-pressure superheater 52. In particular, in the illustrated embodiment, steam from intermediate-pressures stages of the HRSG 32 may enter and be heated by the primary high-pressure superheater 52 and the primary re-heater 58 before being directed into the finishing high-pressure superheater 54 and the secondary re-heater 60, respectively.

As discussed above, the downstream steam temperatures from the finishing high-pressure superheater 54 and the secondary re-heater 60 may be controlled by inter-stage attemperators. After being superheated, steam from the finishing high-pressure superheater 54 may be allowed to flow into the high-pressure stage 30 of the steam turbine 22 by admission control valve 66. Similarly, steam from the secondary re-heater 60 may be allowed to flow into the intermediate-pressure stage 28 (not shown) of the steam turbine 22 by admission control valve 68.

During certain periods of operation, the system may trip or otherwise bypass the steam turbine 22. During situations where the high-pressure stage 30 of the steam turbine 22 is tripped or otherwise bypassed, the admission control valve 66 may be closed and the superheated steam from the finishing high-pressure superheater 54 may be allowed to bypass the high-pressure stage 30 of the steam turbine 22 by high-pressure bypass control valve 70. However, as illustrated in FIG. 2, the bypassed superheated steam may then enter the primary re-heater 58 without being used by any of the steam turbine 22 components and, therefore, may remain superheated. As such, unless the temperature of the bypassed superheated steam is controlled, the downstream temperature of steam from the primary and secondary re-heaters 58, 60 may possibly increase to very high levels where, perhaps, even the inter-stage attemperator 62 may not be able to control them. Accordingly, the bypassed superheated steam may flow through a bypass attemperator 72, which may help control the downstream temperature of the steam, thus helping to prevent the temperatures of the steam from spiraling out of control in the temporarily-created superheating recirculation loop between the primary high-pressure superheater 52, finishing high-pressure superheater 54, primary re-heater 58 and secondary re-heater 60.

Water to be used by the inter-stage attemperator 62 and the bypass attemperator 72 may be supplied by an intermediate-pressure stage 74 of a boiler feedwater pump 76. In general, water may be directed from the low-pressure economizer 40 (not shown) into the intermediate-pressure stage 74 of the boiler feedwater pump 76. Output from the intermediate-pressure stage 74 may be directed into, among others, the three connections lines illustrated in FIG. 2. First, the inter-stage attemperator 62 may be supplied with water from the intermediate-pressure stage 74 through connection line 78. Second, as illustrated by connection line 80, water from the intermediate-pressure stage 74 may be directed into the intermediate-pressure economizer 44 where it may be heated before being split between the intermediate-pressure evaporator 46 and a fuel gas heater 82. The water received by the fuel gas heater 82 from the intermediate-pressure economizer 44 may be used to heat fuel gas, so that the fuel gas may be used in the combustion chamber 18 of the gas turbine 12. Once the water has been used to heat the fuel gas, it may be directed toward either the bypass attemperator 72 or a condenser 84, where the water may be condensed for use in processes of the system 10. The flow of water from the fuel gas heater 82 between the bypass attemperator 72 route and the condenser 84 route may be controlled by a temperature control valve 86 and/or a pressure control valve 88. Third, water from the intermediate-pressure stage 74 of the boiler feedwater pump 76 may be sent directly to the bypass attemperator 72 through connection line 90. A control valve 92 and high-pressure bypass control valve 94 may be used to control the flow of water through connection line 90. In addition, water from the intermediate-pressure stage 74 of the boiler feedwater pump 76 may also be directed into a high-pressure stage 96 of the boiler feedwater pump 76. Although illustrated as an integrated boiler feedwater pump in the embodiment of FIG. 2, the intermediate-pressure stage 74 and the high-pressure stage 96 may be part of separate pumping units.

Therefore, during tripping or other bypassing of the steam turbine 22, water may be supplied to the bypass attemperator 72 using the connection lines 80 and 90 in various ways. In the interest of illustrating some advantages and disadvantages between different embodiments, some representative flow rate and temperature values will be presented. However, these values are merely representative and are not intended to be limiting. Rather, these values are simply presented to show key differences between the embodiments.

In a first embodiment, only connection line 90 may be used to supply the bypass attemperator 72 with water for cooling the superheated steam bypassing the high-pressure stage 30 of the steam turbine 22. In this first embodiment, control valves 86, 88, 92, and 94 may be operated in such a way that all of the water sent to the fuel gas heater 82 is directed into the condenser 84. In addition, the small connection line 98 may simply not be used at all. In either case, in this first embodiment, all of the water supplied to the bypass attemperator 72 may flow through connection line 90 while all of the water supplied to the fuel gas heater 82 may flow through connection line 80.

However, supplying water through the two connection lines 80, 90 in this manner may actually lead to a situation where more water is pumped through the intermediate-pressure stage 74 of the boiler feedwater pump 76 than may be necessary. For instance, the total intermediate-pressure stage flow rate (i.e. not including flow from the intermediate-pressure stage 74 to the high-pressure stage 96 of the boiler feedwater pump 76) and temperature of water through the intermediate-pressure stage 74 of the boiler feedwater pump 76 in this first embodiment may be in the order of 300,000 lb/hr and 300° F. with approximately 10,000 lb/hr through connection line 78, 175,000 lb/hr through connection line 80, and 115,000 lb/hr through connection line 90. Using all of the 115,000 lb/hr of water at approximately 300° F., the bypass attemperator 72 may be capable of cooling the superheated steam from approximately 950° F. upstream of the bypass attemperator 72 to 600° F. downstream of the bypass attemperator 72. Therefore, the temperature of steam downstream of the primary re-heater 58 may be maintained on the order of 920° F., thereby leading to the lower flow rate of only approximately 10,000 lb/hr to the inter-stage attemperator 62.

However, as mentioned above, using only connection line 90 to supply the bypass attemperator 72 with water may lead to an additional 175,000 lb/hr being directed through connection line 80 and intermediate-pressure economizer 44, with approximately 75,000 lb/hr being sent to the fuel gas heater 82 and approximately 100,000 lb/hr being sent to the intermediate-pressure evaporator 46. The water out of the intermediate-pressure economizer 44 may, for instance, be approximately 420° F. and may be capable of heating the fuel gas from approximately 60° F. to approximately 360° F. in the fuel gas heater 82. The water out of the fuel gas heater 82 may be on the order of 140° F. and, in this first embodiment, may be directed into the condenser 84. Therefore, as mentioned above, using only connection line 90 to supply water to the bypass attemperator 72 may lead to water being sent through both connection line 90 and through connection line 80 for use in, among other things, the fuel gas heater 82.

In a second embodiment, only connection line 80 may be used to supply the bypass attemperator 72 with water for cooling the superheated steam bypassing the high-pressure stage 30 of the steam turbine 22. In this second embodiment, control valves 86, 88, 92, and 94 may be operated in such a way that no water is sent through connection line 90 and that all of the water sent through the fuel gas heater 82 is also sent to the bypass attemperator 72, bypassing the condenser 84. It should be noted that this bypassing of the condenser 84 is only done temporarily during tripping or other bypassing of the steam turbine 22. Once normal operation resumes, the water from the fuel gas heater 82 may again be routed to the condenser 84. In addition, connection line 90 may simply not be used such that the flow through connection line 80 is directed to the bypass attemperator 72. In either case, the water used in the fuel gas heater 82 to heat the fuel gas will also be used to cool the superheated steam bypassing the high-pressure stage 30 of the steam turbine 22.

As such, some of the heated water leaving the intermediate-pressure economizer 44 may be cooled at the fuel gas heater 82 and thus may be suitable as a cooling source at the bypass attemperator 72. For instance, the total intermediate-pressure stage flow rate and temperature of water through the intermediate-pressure stage 74 of the boiler feedwater pump 76 in this second embodiment may be on the order of 200,000 lb/hr and 300° F. with approximately 25,000 lb/hr through connection line 78 and 175,000 lb/hr through connection line 80. Therefore, the total intermediate-pressure stage flow rate through the intermediate-pressure stage 74 may be considerably lower than in the first embodiment, where connection line 90 is used as a dedicated line for supplying the bypass attemperator 72 with water. Similar to the first embodiment described above, where only connection line 90 is used to supply the bypass attemperator 72 with water, the 175,000 lb/hr directed through connection line 80 and intermediate-pressure economizer 44 may result in approximately 75,000 lb/hr being sent to the fuel gas heater 82 and approximately 100,000 lb/hr being sent to the intermediate-pressure evaporator 46. The water out of the intermediate-pressure economizer 44 may again be approximately 420° F. and may be capable of heating the fuel gas from approximately 60° F. to approximately 360° F. However, in this second embodiment, the water exiting the fuel gas heater 82 may bypass the condenser 84 and may be sent directly to the bypass attemperator 72 at a temperature of approximately 140° F.

Therefore, in this second embodiment, the water being sent to the bypass attemperator 72 may have a lower flow rate (for instance, approximately 75,000 lb/hr versus approximately 115,000 lb/hr) and a lower temperature (for instance, approximately 140° F. versus approximately 300° F.) than the first embodiment, using only connection line 90 to supply water to the bypass attemperator 72. However, although the temperature of the water may be lower, the fact that the flow rate is lower may actually decrease the ability of the water source to cool the superheated steam in the bypass attemperator 72. For instance, the temperature downstream of the bypass attemperator 72 may be as high as approximately 685° F. in this second embodiment with the temperature of the steam downstream of the primary re-heater 58 reaching, for example, 1000° F. (as opposed to 600° F. downstream of the bypass attemperator 72 and 920° F. downstream of the primary re-heater 58 in the first embodiment, using water from only connection line 90).

However, as mentioned above, even increasing the flow rate into the inter-stage attemperator 62 to 25,000 lb/hr in order to maintain a suitable downstream re-heater temperature of the steam may only increase the total intermediate-pressure stage flow rate of water to approximately 200,000 lb/hr, which is considerably lower than with the first embodiment, where only connection line 90 supplies water to the bypass attemperator 72. In other words, using water discharged from the fuel gas heater 82 as cooling water in the bypass attemperator 72 may allow for lower total intermediate-pressure stage flow rates while also maintaining suitable superheated steam temperatures during tripping or other bypassing of the steam turbine 22. Lowering the total intermediate-pressure stage flow rate through the intermediate-pressure stage 74 of the boiler feedwater pump 76 may lead to lower overall operating costs in that the pump may be sized smaller and may also lead to lower power costs.

However, from a practical standpoint, both connections lines 80, 90 may be available in parallel. This multi-line mode may allow for the more efficient mode of operation where water is supplied to the bypass attemperator 72 from the discharge of the fuel gas heater 82, while also allowing for the use of the connection line 90 as a supplementary source of water for the bypass attemperator 72. In other words, both connection lines 80, 90 may share the duties of supplying water to the bypass attemperator 72. In this third embodiment, the system may operate control valves 86, 88, 92, and 94 to provide a similar or identical flow rate through the fuel gas heater 82 as the previously discussed second embodiment, but the system may increase the flow rate through connection line 90 to maintain a similar or identical temperature of superheated steam downstream of the bypass attemperator 72 as the previously discussed first embodiment. Thus, the dual mode of this third embodiment, using both lines 80 and 90, may provide improved attemperation at the bypass attemperator 72 compared to the second embodiment while also providing decreased total feedwater flow rate compared to the first embodiment.

For instance, the total intermediate-pressure stage flow rate and temperature of water through the intermediate-pressure stage 74 of the boiler feedwater pump 76 in this embodiment may be in the order of 220,000 lb/hr and 300° F. with approximately 10,000 lb/hr through connection line 78, 175,000 lb/hr through connection line 80, and 35,000 lb/hr through connection line 90. Therefore, the total intermediate-pressure stage flow rate through the intermediate-pressure stage 74 may still be considerably lower than in the first embodiment, where connection line 90 is used as a dedicated line for supplying the bypass attemperator 72 with water. In addition, similar to the first embodiment described above, where only connection line 90 is used to supply the bypass attemperator 72 with water, the 175,000 lb/hr directed through connection line 80 and intermediate-pressure economizer 44 may result in approximately 75,000 lb/hr being sent to the fuel gas heater 82 and approximately 100,000 lb/hr being sent to the intermediate-pressure evaporator 46. The water out of the intermediate-pressure economizer 44 may again be approximately 420° F. and may be capable of heating the fuel gas from approximately 60° F. to approximately 360° F. However, in this third ("dual mode") embodiment, the approximately 140° F. water exiting the fuel gas heater 82 may not only bypass the condenser 84 but may also be combined with the approximately 300° F. from connection line 90. This may, for example, lead to 110,000 lb/hr of approximately 190° F. water being delivered to the bypass attemperator 72 for attemperation purposes.

Therefore, in this third ("dual mode") embodiment, the water being sent to the bypass attemperator 72 may have a slightly lower flow rate (for instance, approximately 110,000 lb/hr versus approximately 115,000 lb/hr) and a lower temperature (for instance, approximately 190° F. versus approximately 300° F.) than the first embodiment, using only connection line 90 to supply water to the bypass attemperator 72. However, in this third embodiment, the bypass attemperator 72 may be capable of maintaining the temperature downstream of the bypass attemperator 72 at approximately the same temperature as in the first embodiment, using water from only connection line 90. Therefore, the total flow rate used in the inter-stage attemperator 62 may also be very similar to the first embodiment, using water from only connection line 90. As such, using water discharged from the fuel gas heater 82 as well as supplemental water from connection line 90 as cooling water in the bypass attemperator 72 may allow for lower total intermediate-pressure stage flow rates, while also maintaining suitable superheated steam temperatures during tripping or other bypassing of the steam turbine 22. Again, lowering the total intermediate-pressure stage flow rate through the intermediate-pressure stage 74 of the boiler feedwater pump 76 may lead to lower overall operating costs.

Figure 3:
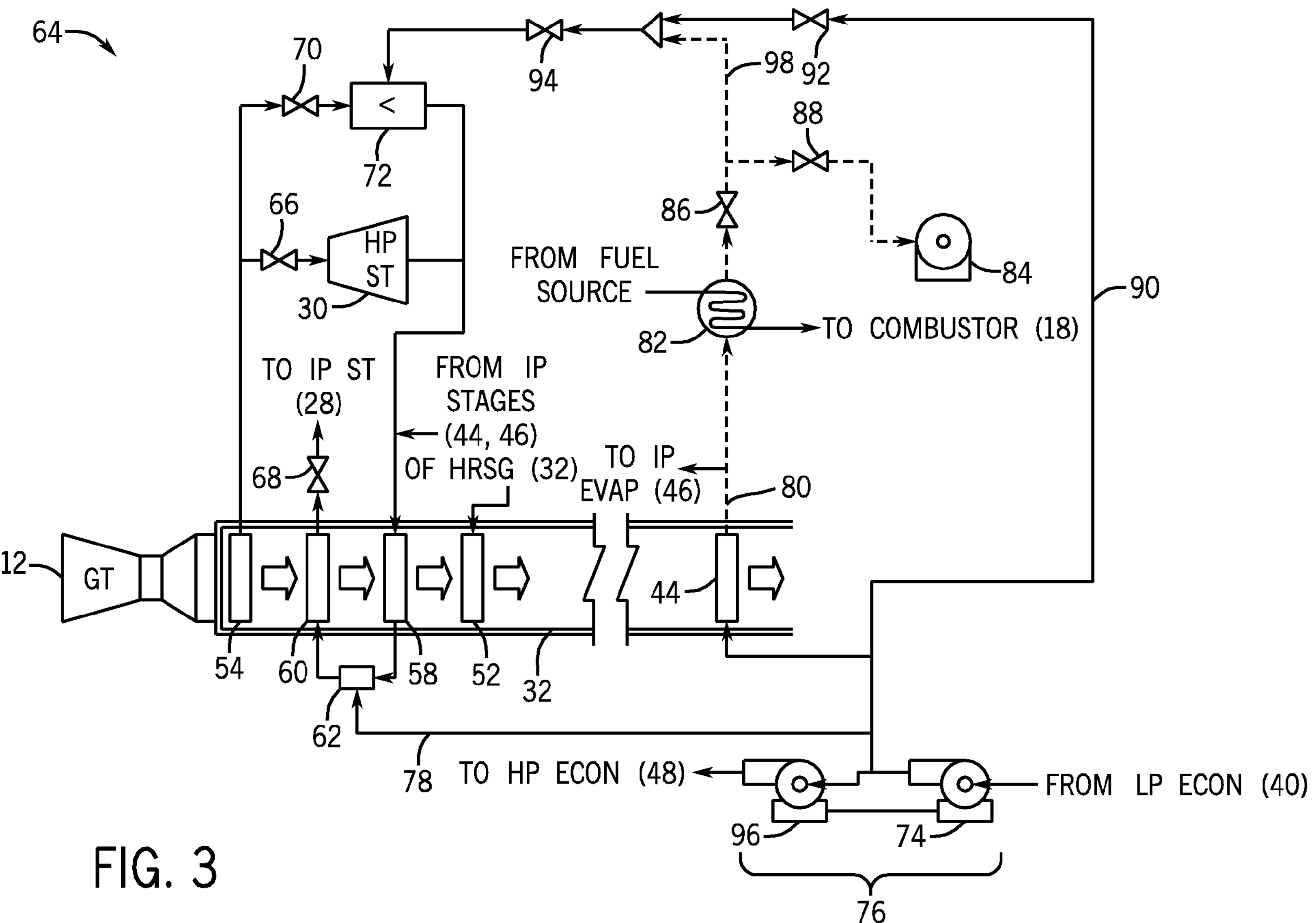
FIG. 3 is another detailed schematic flow diagram of an exemplary combined cycle power generation system which may utilize the steam attemperation systems and methods of the disclosed embodiments.

In addition, using connection lines 80, 90 together in parallel may allow for more reliable supply of cooling water to the bypass attemperator 72 during tripping or other bypassing of the steam turbine 22. For instance, FIG. 3 is another detailed schematic flow diagram of an exemplary combined cycle power generation system 64 which may utilize the steam attemperation systems and methods of the disclosed embodiments. However, FIG. 3 illustrates a scenario where the fuel gas heater 82 may be out of service or completely removed from the system. In this scenario, similar to the first embodiment described above, water may not be routed from the fuel gas heater 82 to the bypass attemperator 72. Therefore, connection line 90 may be used to compensate for the temporary inability of the fuel gas heater 82 to supply water to the bypass attemperator 72. In this scenario, once the fuel gas heater 82 is back in service, the supply of water to the bypass attemperator 72 during tripping or other bypassing of the steam turbine 22 may be accomplished by the fuel gas heater 82.

Figure 4:
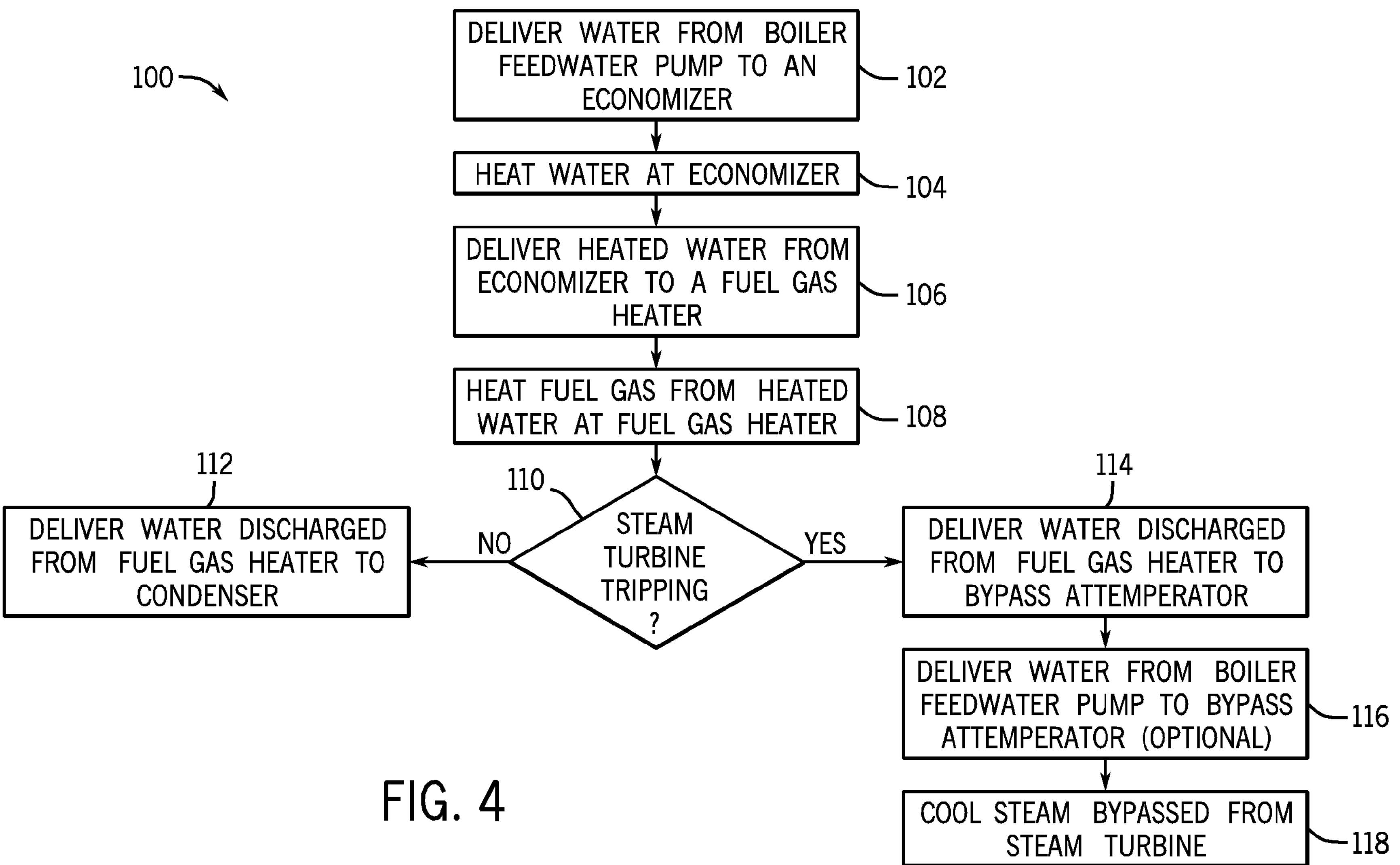
FIG. 4 is a flow diagram of an exemplary method for attemperation of superheated steam bypassing a steam turbine using the disclosed embodiments.

FIG. 4 is a flow diagram of an exemplary method 100 for attemperation of superheated steam bypassing a steam turbine using the disclosed embodiments. At step 102, water may be delivered from a boiler feedwater pump to an economizer. In the context of the combined cycle power generation system 10 discussed herein, the water may more particularly be delivered from the intermediate-pressure stage 74 of a boiler feedwater pump 76 to the intermediate-pressure economizer 44. At step 104, the water may be heated by the economizer (e.g., the intermediate-pressure economizer 44). At step 106, the heated water from the economizer may be delivered to a fuel gas heater. In particular, heated water from the intermediate-pressure economizer 44 may be delivered to either the intermediate-pressure evaporator 46 or to the fuel gas heater 82. At step 108, fuel gas may be heated in the fuel gas heater 82 with the heated water from the economizer (e.g., the intermediate-pressure economizer 44).

Next, at step 110, a determination may be made of whether the steam turbine 22 is currently tripping or otherwise being bypassed. If the steam turbine 22 is not currently tripping or otherwise being bypassed, the method 100 may continue to step 112 where water discharged from the fuel gas heater 82 may be delivered to the condenser 84. However, if the steam turbine 22 is currently tripping or otherwise being bypassed, the method 100 may proceed to step 114. In step 114, instead of being delivered to the condenser 84, water from the fuel gas heater 82 may be delivered to the bypass attemperator 72. At step 116, supplemental water from a boiler feedwater pump (e.g., the intermediate-pressure stage 74 of the boiler feedwater pump 76) may optionally be delivered directly to the bypass attemperator 72. This step may be performed, for instance, if water from the intermediate-pressure stage 74 of the boiler feedwater pump is delivered directly to the bypass attemperator 72 through connection line 90 to supplement water delivered to the bypass attemperator 72 from the fuel gas heater 82. Finally, at step 118, the steam bypassing the steam turbine 22 may be cooled using water from the fuel gas heater 82 and, optionally, the supplemental water received directly from the boiler feedwater pump 76.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of cooling steam bypassed from a steam turbine, comprising:

delivering water from an intermediate pressure stage of a boiler feedwater pump to an economizer;

heating the water using the economizer;

delivering the water from the economizer to a fuel gas heater;

transferring heat from the water to a fuel gas via the fuel gas heater, thereby heating the fuel gas and cooling the water;

delivering the water from the fuel gas heater to a bypass attemperator; and transferring heat from the steam bypassed from the steam turbine to the water from the fuel gas heater via the bypass attemperator, thereby cooling the steam.

2. The method of claim 1, comprising delivering water directly from the boiler feedwater pump to the bypass attemperator.

3. The method of claim 1, comprising:

delivering water from the intermediate pressure stage of the boiler feedwater pump to a re-heater attemperator; and transferring heat from the steam to the water from the intermediate pressure stage of the boiler feedwater pump via the re-heater attemperator, thereby cooling the steam.

4. A method of cooling steam, comprising:

delivering water from a fuel gas heater to a bypass attemperator; cooling steam using the bypass attemperator and the water from the fuel gas heater; and activating a pressure control valve during tripping of a steam turbine to prevent water from the fuel gas heater from being delivered to a condenser.

5. The method of claim 4, comprising cooling steam bypassed from the steam turbine during tripping of the steam turbine.

6. The method of claim 4, comprising delivering supplemental water directly from a boiler feedwater pump to the bypass attemperator.

7. The method of claim 4, comprising not delivering water directly from a boiler feedwater pump to the bypass attemperator.

8. The method of claim 4, comprising delivering water from a boiler feedwater pump to the fuel gas heater.

9. The method of claim 8, comprising:

delivering water from the boiler feedwater pump to an economizer;

heating the water using the economizer; and delivering the heated water from the economizer to the fuel gas heater.

10. The method of claim 9, comprising heating fuel gas using the fuel gas heater and the heated water delivered to the fuel gas heater.

11. The method of claim 8, comprising:

delivering water from the boiler feedwater pump to a re-heater attemperator; and cooling the steam using the re-heater attemperator and the water delivered from the boiler feedwater pump.

12. A steam attemperation system, comprising:

a fuel gas heater configured to heat fuel gas using heated feedwater and to discharge the water after use in the fuel gas heating process;

an economizer configured to heat feedwater and to deliver the heated feedwater to the fuel gas heater; and a bypass attemperator configured to cool steam using the water discharged from the fuel gas heater, wherein the steam has been bypassed from a steam turbine during tripping of the steam turbine.

13. The steam attemperation system of claim 12, comprising a boiler feedwater pump configured to deliver the feedwater to the economizer.

14. The steam attemperation system of claim 13, comprising a re-heater attemperator configured to cool steam from the bypass attemperator.

15. The steam attemperation system of claim 14, wherein the re-heater attemperator uses feedwater from the boiler feedwater pump to cool the steam.

16. The steam attemperation system of claim 13, wherein the boiler feedwater pump is configured to deliver feedwater directly to the bypass attemperator.

17. The steam attemperation system of claim 12, wherein the fuel gas heater is configured to deliver the discharged water to a condenser when the steam turbine is not tripping.

18. The steam attemperation system of claim 12, wherein the bypass attemperator use only water discharged from the fuel gas heater to cool the steam bypassed from the steam turbine during tripping of the steam turbine.

19. A method of cooling steam, comprising:

delivering water from a boiler feedwater pump to an economizer;

heating the water using the economizer;

delivering the heated water from the economizer to a fuel gas heater;

delivering water from the fuel gas heater to a bypass attemperator; and cooling steam using the bypass attemperator and the water from the fuel gas heater.

20. A method of cooling steam, comprising:

delivering water from a boiler feedwater pump to a fuel gas heater;

delivering water from the fuel gas heater to a bypass attemperator;

cooling steam using the bypass attemperator and the water delivered to the bypass attemperator from the fuel gas heater;

delivering water from the boiler feedwater pump to a re-heater attemperator; and cooling the steam using the re-heater attemperator and the water delivered to the re-heater attemperator from the boiler feedwater pump.

* * * * *